May 20, 1952 R. J. GORECKI 2,597,790
METHOD FOR MAKING BELTS
Original Filed March 5, 1947 5 Sheets-Sheet 2
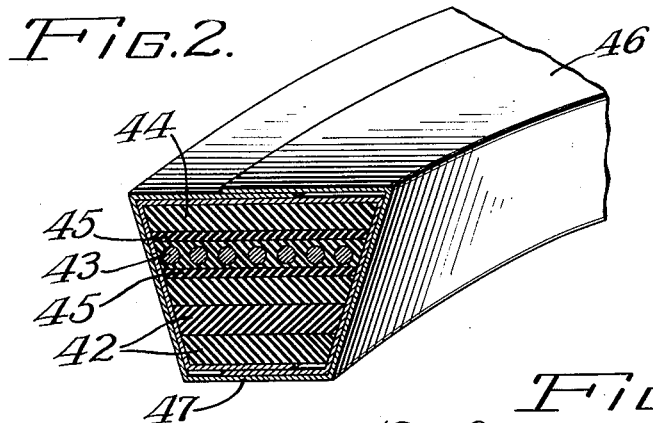
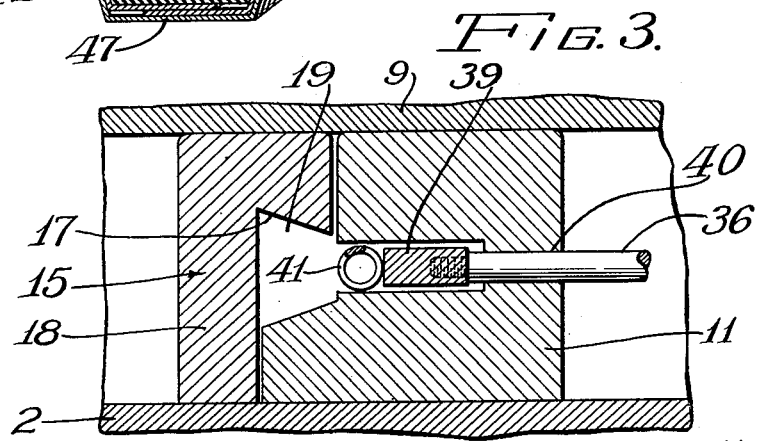
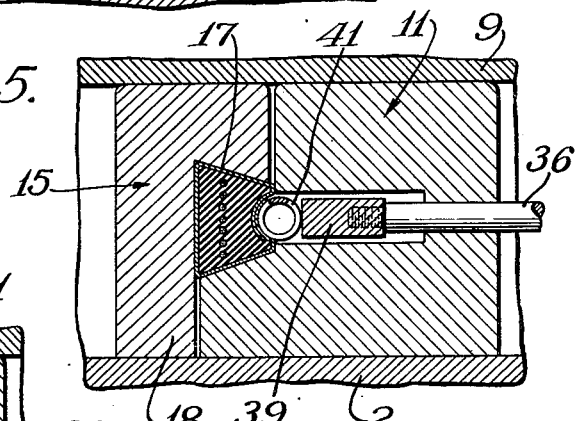
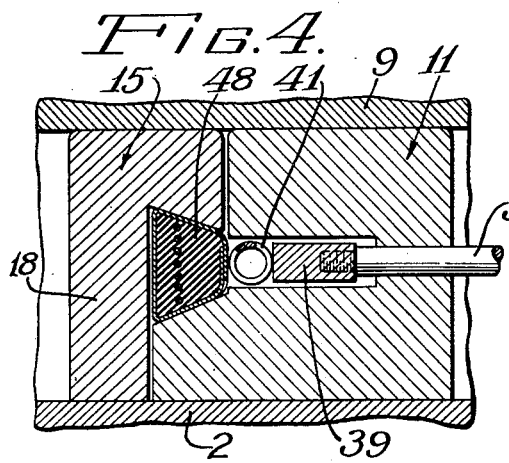
Inventor:
Robert J. Gorecki
By Lee J. Gary
Attorney May 20, 1952  R. J. GORECKI  2,597,790
METHOD FOR MAKING BELTS
Original Filed March 5, 1947  5 Sheets-Sheet 3
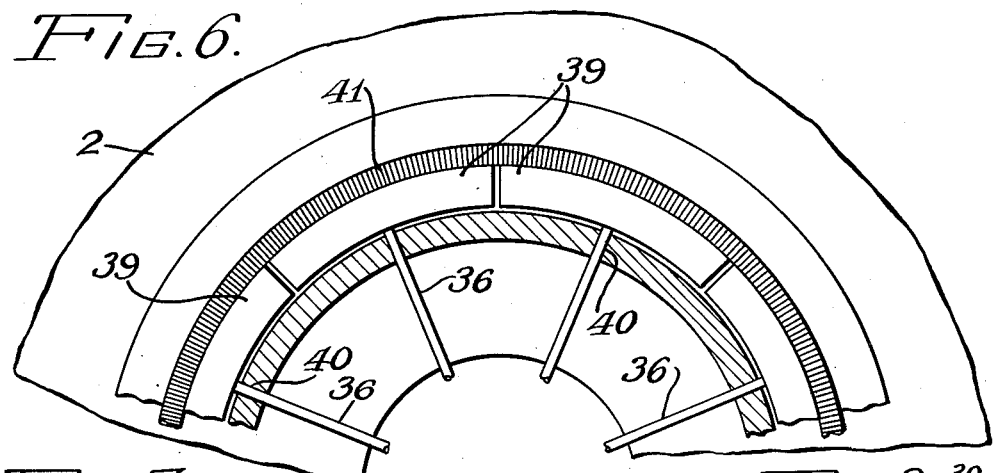
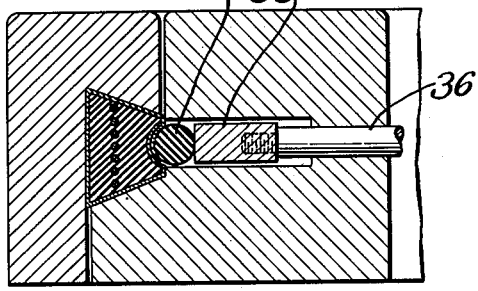
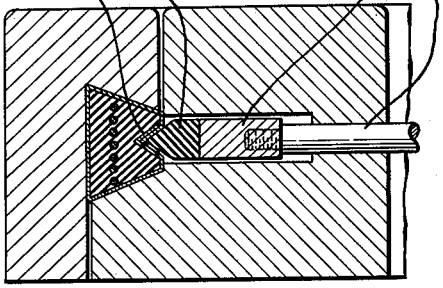
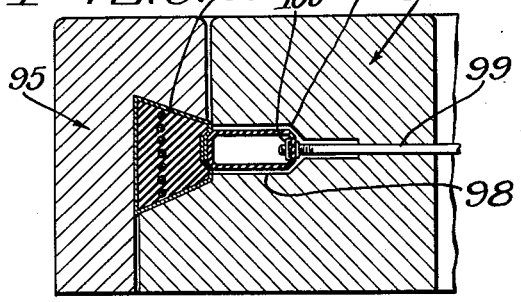
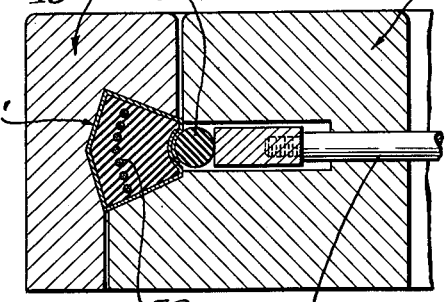
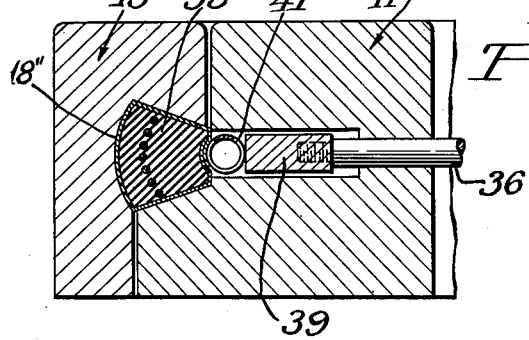
Inventor:
Robert J. Gorecki
By Lee J. Gary
Attorney

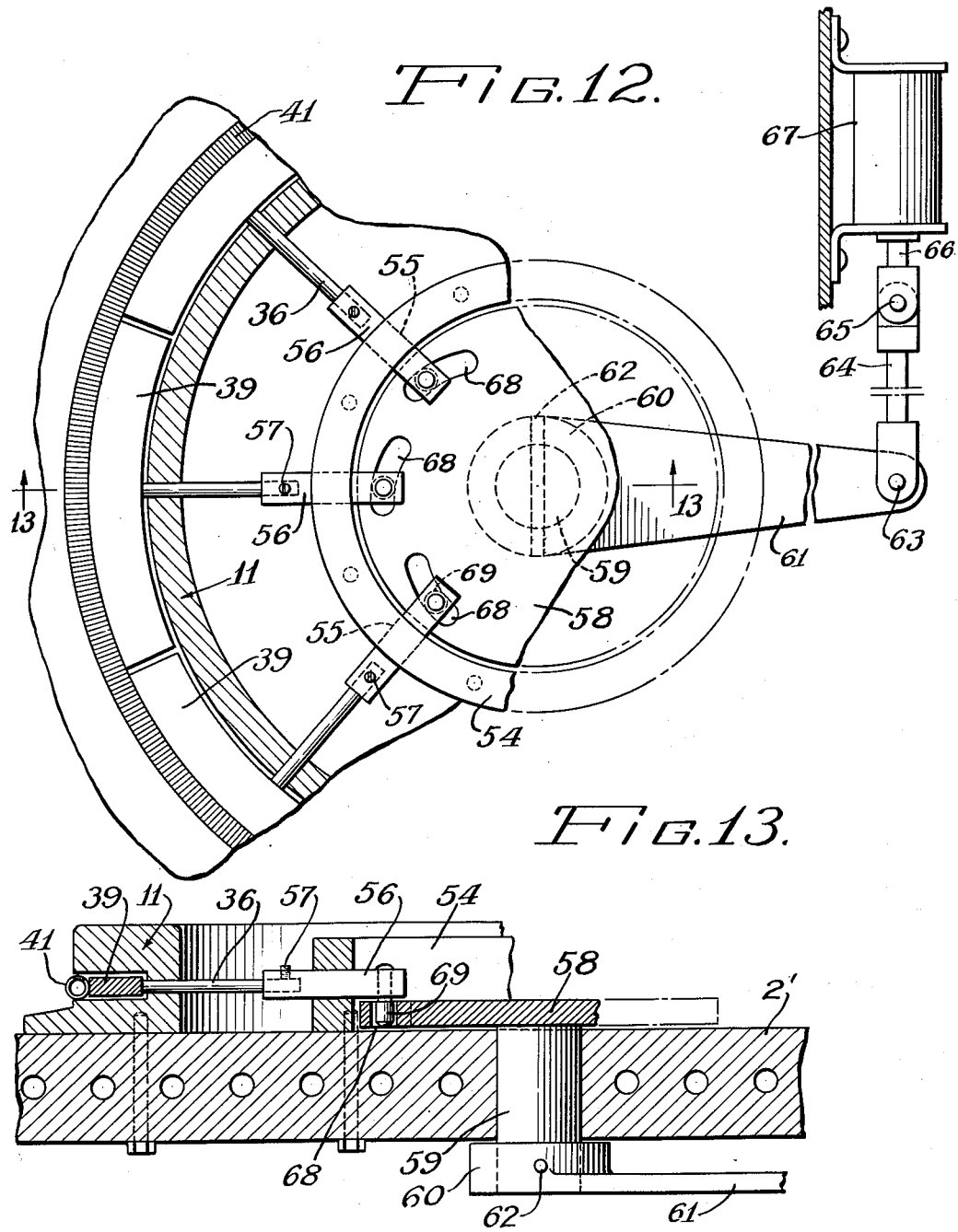

May 20, 1952   R. J. GORECKI   2,597,790
METHOD FOR MAKING BELTS
Original Filed March 5, 1947   5 Sheets-Sheet 5

Inventor:
Robert J. Gorecki
By Lee J. Gary
Attorney

Patented May 20, 1952

2,597,790

UNITED STATES PATENT OFFICE 2,597,790

METHOD FOR MAKING BELTS

Robert J. Gorecki, Passaic, N. J., assignor to Raybestos-Manhattan, Inc., Passaic, N. J., a corporation of New Jersey Original application March 5, 1947, Serial No. 732,437. Divided and this application March 8, 1949, Serial No. 80,299

4 Claims. (Cl. 18—53)

This invention relates to improvements in a method for manufacturing transmission belts, and is a divisional application of my copending application Serial No. 732,437, filed March 5, 1947, now Patent No. 2,518,137 entitled "Method and Means for Making Belts" of the V-type, that is, the usual trapezoidal sectioned belt, and refers specifically to a method whereby the belt, during molding and curing, is subjected to a substantially constant predetermined radially applied pressure which compensates for volume variations in the uncured belt carcass.

Heretofore, in the manufacture of belts of the character described, it has been the practice to insert the uncured belt carcass into either a completely enclosed mould of substantially constant volume and cure the same therein under pressure and heat, or to insert the carcass into a three-sided mould and establish pressure and heat in the mould, relying upon the wrapping on the top face of the belt to confine the body of the belt upon fourth side of the belt.

In the first case hereinbefore mentioned, the mould, being of constant volume, depends for uniformity in belt production upon the volume of the carcass. If the carcass contains above a predetermined volume, the excess is squeezed out of the juncture lines of the mould and requires subsequent trimming. This operation involves the cutting of the belt cover which seriously reduces the wear resisting characteristics of the belt. In addition, the body of the belt, particularly the strength members may be seriously distorted resulting in an improperly "tracking" belt and also concentrating stresses on only a portion of the strength members. If the carcass contains below a predetermined volume, the body of the belt does not completely fill the mould and, hence, an improperly shaped and "pressured" belt results.

In the three-side type of moulding operation, excess of insufficient volume of the carcass is reflected upon the wrapped face of the belt and frequently results in distortion or mal-positioning of the strength members resulting from non-uniform strain of the wrapped unsupported face of the belt.

The present invention resides in a method for moulding belts of the type described wherein the carcass or body of the belt is subjected to substantially constant pressure during cure, pressurizing of the belt being accomplished substantially in increments throughout the length of the belt at the inner radial face of the belt. This results in a belt with its outer and lateral faces "clearly" moulded, its wrapping being uncut and the strength members undistorted, or if moved, being moved in a controlled manner.

The apparatus for carrying out my invention may take a number of forms, all being characterized by a mould having confining surfaces for the outer face and lateral sides and having a resilient pressurizing element which acts radially outwardly to compress the carcass during the curing period.

The objects and advantages of my invention will be more apparent from the accompanying drawings and following detailed description.

In the drawings:

Fig. 2 is a fragmentary, detail perspective view, parts being shown in section, of a belt carcass.

Fig. 3 is a fragmentary detail sectional view illustrating the complementary mould sections.

Fig. 4 is a similar view showing a belt carcass in the mould cavity prior to the application of radial pressure.

Fig. 5 is a similar view illustrating the parts in pressurizing position.

Fig. 6 is a fragmentary plan sectional view taken on line 6—6 of Fig. 1.

Fig. 7 is a fragmentary sectional view illustrating a modified resilient pressure member.

Fig. 8 is a similar view illustrating another modified form of resilient pressure member.

Fig. 9 is a similar view illustrating a further modification of the invention.

Fig. 10 is a similar view illustrating a mould cavity having a dihedral outer face portion.

Fig. 11 is a similar view illustrating a mould cavity having an arcuate outer face section.

Fig. 12 is a fragmentary diagrammatic plan view of another modification of my invention.

Fig. 13 is a sectional view taken on line 13—13 of Fig. 12.

Figure 1:
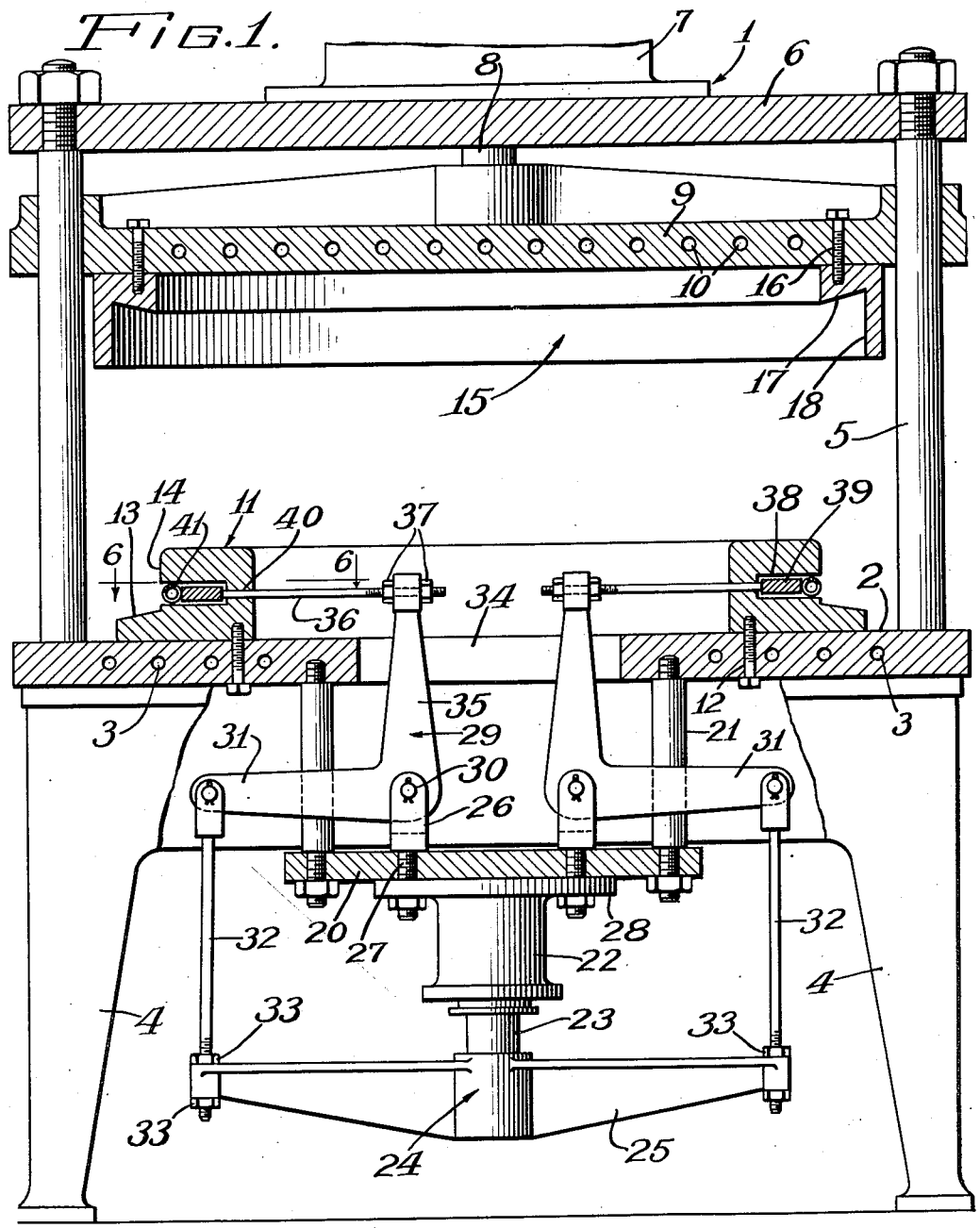
Fig. 1 is a vertical, sectional view, parts being shown in elevation, of a moulding machine upon which my invention may be carried out.

Referring in detail to the drawings, I indicates a moulding machine comprising an embodiment of my invention. Machine I comprises a lower platen 2 which is provided with a plurality of communicating openings 3 through which a heated fluid may be passed to heat the body of the platen. The platen 2 is supported upon legs 4 and carries a plurality of vertically positioned standards or guides 5, which are secured together at their top portions by a spider or spacing member 6.

The member 6 carries a cylinder 7, having a vertically movable piston rod or ram 8 which projects through the supporting spider 6. The ram 8 is operatively connected to upper platen 9, which is also provided with a plurality of intercommunicating openings 10 through which a heated fluid may be passed in order to heat the upper platen. Adjacent the edges of the platen 9, the same rides upon guides 5 when vertical motion is imparted thereto by the piston rod 8.

An annular mould section 11 is positioned upon lower platen 2 and is secured thereto by means of cap screws 12 or the like, the mould section 11 being in heat conductive relationship with respect to the lower platen 2 whereby the heat of the fluid passing through the intercommunicating openings 3, is conducted to the section 11. The section 11 comprises the inner portion of a mould and has an inclined moulding surface 13, which is adapted to form one lateral wall of the belt, and a surface 14 which is adapted to form the inner peripheral surface of the belt.

A mould section 15 is secured, by means of cap screws 16, to the lower face of the upper platen 9, said section being in heat conductive relationship with respect to the upper platen 9. The section 15 is annular and is adapted to comprise the mating portion of the mould consisting of sections 11 and 15. The section 15 is provided with an inclined surface 17, which is adapted to form the opposite lateral face of the belt and is also provided with a vertical face 18, which is adapted to form the outer face of the belt. When the upper platen 9 is lowered to operative position, the two cooperating portions of the mould comprising sections 11 and 15, provide a trapezoidal sectioned cavity 19, as shown best in Fig. 3.

A supporting plate 20 is carried by means of bolts 21 which are threadedly engaged into the lower portion of platen 2. The supporting plate 20 carries a fluid pressure cylinder 22 in which a piston (not shown) operates, said piston being operatively connected to piston rod or ram 23. At the end of the piston rod 23, a spider 24 is mounted which carries a plurality of radially extending arms 25.

A plurality of circularly disposed bifurcated lugs 26 are mounted upon the supporting plate 20 by means of bolts 27 which also pass through the base portion 28 of the cylinder 22. A bell crank lever 29 is pivotally positioned as at 30 in each pair of lugs 26. One arm 31 of each lever 29 is pivotally connected to a link 32, which at its opposite end is secured by means of nuts 33 to one of the arms 25 of spider 24. The central portion of the lower platen 2 is provided with an aperture 34, into which arms 35 of the bell crank levers 29 extend. At the terminal ends of the arms 35, rods 36 are operatively engaged by means of nuts 37.

The lower mould section 11 is provided with an annular slot 38 which opens into the mould cavity 19. Within said slot a plurality of circumferentially spaced segments 39 are positioned. A plurality of apertures 40 are provided in the section 11 and one of said arms 36 extends through each of said apertures and is rigidly connected to the central portion of each of the segments 39. Endless coil spring 41 is also adapted to be positioned within the radial slot 38, said coil spring embracing the outer surfaces of the segments 39. In positioning the spring 41 upon the segments 39, said spring is tensioned to a predetermined degree so that it snugly engages the outer faces of the segments.

In the manufacture of "V-belts" of the type contemplated herein, the uncured belt carcass is built up of a plurality of layers of rubberized fabric 42, or said layers may comprise rubber or a rubber composition. Positioned above the layers 42 are a plurality of strength members 43 which may comprise a plurality of longitudinally extending cords, or may comprise wire strands, or if desired, said strength members may comprise fabric, having the filler threads thereof extending longitudinally of the length of the belt. A layer 44 may be positioned above the strength members 43 and may be constructed of a material similar to the layers 42. Frequently, it is desirable to surround the strength members 43 with a relatively soft "tie gum" rubber 45.

In the construction of the usual belt, the layers 42 are frequently referred to as the compression members, and the layer 44 is referred to as the tension member. The strength members 43 are the elements which withstand the stress when the belt is placed in operation and normally said strength members are disposed at or adjacent the neutral plane of the belt, that is, that portion of the belt which, when the belt is flexed around a pulley, is neither subjected to tension nor compression. Over the assembly comprising the layers 42, strength members 43 and layer 44, one or more fabric wrappers 46 are positioned. The wrappers 46 are frequently also rubberized.

The assembly hereinbefore described, is referred to as the belt carcass and is in the uncured state. In Fig. 2 the belt carcass is illustrated as being of trapezoidal cross section. However, said belt carcass may be of square cross section and may be formed to trapezoidal section during the moulding operation. However, for purposes of illustrating my invention, the belt carcass is shown as being of trapezoidal section prior to curing and pressing.

The carcass thus formed is endless and, when utilizing my invention, said carcass is positioned over the lower mould section 11 so as to position the inner portion 47 of the belt in contact with the surface 14 of the mould section 11, and a side of the carcass in contact with the inclined moulding surface 13 of said lower section. Fluid under pressure is then introduced into the cylinder 7 and the upper mould section is brought into position, thus confining the carcass, hereinafter referred to as carcass 48 in the cavity 19, as shown best in Fig. 4. It will be noted that the carcass 48 may, when the upper section 15 is brought downwardly into position, be more or less loosely disposed within the cavity 19, depending upon the original volume of the carcass. However, frequently the carcass 48 is positioned snugly within the cavity 19, but squeezed therein by means of the pressure established by the piston rod 8.

With the upper section 15 in the position shown in Fig. 4 fluid under pressure is introduced into the cylinder 22, thus moving the piston rod 23 downwardly. This movement of the piston rod rocks the bell crank levers 29 about their pivot points 30, and rods 36 are moved radially outwardly, thus moving spring 41 into pressure contact with the inner face 47 of the carcass. This action of the machine is best illustrated in Fig. 5. It will be noted that the spring 41 establishes pressure upon the inner face 47 of the carcass and thus moves the remaining faces of the carcass into contact with the faces 13, 14, 17 and 18 defining the mould cavity. In this manner a substantially constant pressure is brought to bear upon the carcass. During the pressurizing operation, the mould comprising the sections 11 and 15 is heated and simultaneously with the pressurizing of the carcass, the body thereof is cured.

The radial movement of the rods 36 is relatively small as is also the movement of the rods 32. Consequently, for all practical purposes, said rods may be considered as moving in straight lines. Consequently, the connections with rods 32 to the spider arms 25 may be substantially rigid connections as may be the connections of rods 36 to the bell crank arms 35.

When the belt has been properly cured, pressure is relieved from the cylinder 22 thereby permitting the bell crank lever arms 35 to move radially inwardly under the influence of springs 41. However, if desired, fluid pressure may be established on the lower portion of the piston within cylinder 22 to positively move the bell crank lever arms 35 inwardly. In view of the fact that the spring 41 is under tension, said spring will follow the inward movement of the segments 39.

The springs 41, in view of the fact that diametrical pressure is established upon the coils thereof, are constructed of sufficiently heavy wire as to withstand the pressure exerted by the radially outward movement of the arms 36 and segments 39. I have found that in compressing and curing a belt carcass of 0.26 square inch cross section, a coil spring of 30 gauge wire is suitable, when exerting a pressure of 350 pounds per square inch thereupon. Of course, if the radial pressure is increased a heavier spring will be employed.

Referring particularly to Fig. 7, I have found that a tension member 49 comprising an endless rubber band of circular cross section, may be employed instead of the spring 41. Similar to the mounting of spring 41 within the annular notch 38, the band 49 is normally under tension within said notch.

As shown best in Fig. 8, a band 50 which is constructed of rubber or other resilient material may be employed instead of the band 49, the band 50 having a dihedral face 51 which embeds itself into the inner face of the carcass during the pressing operation to establish constant pressure upon the carcass.

Referring particularly to Fig. 10, outer mould section 15' may be so constructed as to have an outer face 18' in the form of a dihedral angle. It is not necessary that the belt carcass be constructed with a dihedral outer surface, since a belt carcass with a flat outer surface as shown in Fig. 2, may be positioned within the mould cavity and when pressure is established upon the rods 36, said pressure will tend to cause the band member 49 to establish a degree of pressure within the body of the belt sufficient to displace the outer surface of the belt into conformity with the dihedral outer surface 18' of the section 15'.

It will be noted that although the strength members 43 may have been disposed in a plane substantially parallel to the outer face of the belt, the movement of the body of the carcass will tend to displace the strength members into planes substantially parallel to the outer face 18' of the outer mould section, as shown best at 52 in Fig. 10.

It will be further noted that when the plane of the strength members is normally disposed parallel to the outer face of the belt and a flat outer surface 18 is used to form the outer surface of the belt, substantially no movement of the strength members takes place. However, by employing a flat outer surface carcass in a mould cavity having a dihedral outer surface 18', movement of the strength members does take place but said movement is under controlled conditions, so as to dispose the plane of the strength members in a predetermined manner.

Referring particularly to Fig. 11, an outer mould section 15" is shown wherein outer surface 18" of the mould cavity is arcuate. In utilizing this type of outer mould section, the belt carcass may be constructed with a flat outer surface as illustrated in Fig. 2, and when pressure is established upon the spring tension member 41, the outer surface of the carcass will move into contact with the arcuate surface 18". As has been hereinbefore described in conjunction with the strength members 53, which may initially have been in a plane parallel to the outer surface of the carcass, the strength members will now be disposed in the form of an arc which is substantially parallel to the outer surface 18' of the mould cavity.

Referring particularly to Figs. 12 and 13 of the drawings, a modified means for operatively moving the segments into pressurizing position is shown. In view of the fact that the remaining instrumentalities comprising the invention remain the same, only those portions of the invention which are changed will be herein described, it being understood that the remaining parts of the machine are similar.

In this form of my invention a ring 54 is mounted upon the upper face of lower platen 2'. Said ring is provided with a plurality of circumferentially spaced apertures 55, which extend radially. Connecting members 56 are slidably positioned in the apertures 55, the outer ends of said connecting members being recessed to receive the ends of rods 36, which may be secured to the connecting members 56 by means of set screws 57.

A disk 58 is rotatably mounted upon a shaft 59, which projects through the platen 2'. The lower end of shaft 59 is connected to hub 60 of a crank arm 61, said connection comprising a pin 62 which extends diametrically through hub 60 and shaft 59. The opposite end of arm 61 is pivotally connected as at 63 to a link 64, which in turn, is pivotally connected as at 65 to piston rod 66. The piston rod 66 carries at its end a piston (not shown) which operates within a pressure cylinder 67.

The disk 58 is provided with a plurality of arcuate apertures 68, the arc of said apertures being eccentric with respect to the disk. A follower member 69 is carried upon each of the connectors 56, said follower members being disposed within apertures 68.

The arrangement is such that when a belt carcass 48 is positioned within the mould cavity and the upper and lower platens are heated, the two sections of the moulding are brought together as hereinbefore described. Fluid under pressure is then introduced into the upper portion of the cylinder 67 and the piston rod 66, through the agency of the link 64, rocks the arm 61 in a clockwise direction as viewed in Fig. 12. This motion of the arm 61 rotates disk 58 which in turn causes the connecting members 56 to move radially outwardly thereby moving the segments 39 into contact with the member 41 which, in turn, subjects the inner face of the carcass to pressure.

Figure 14:
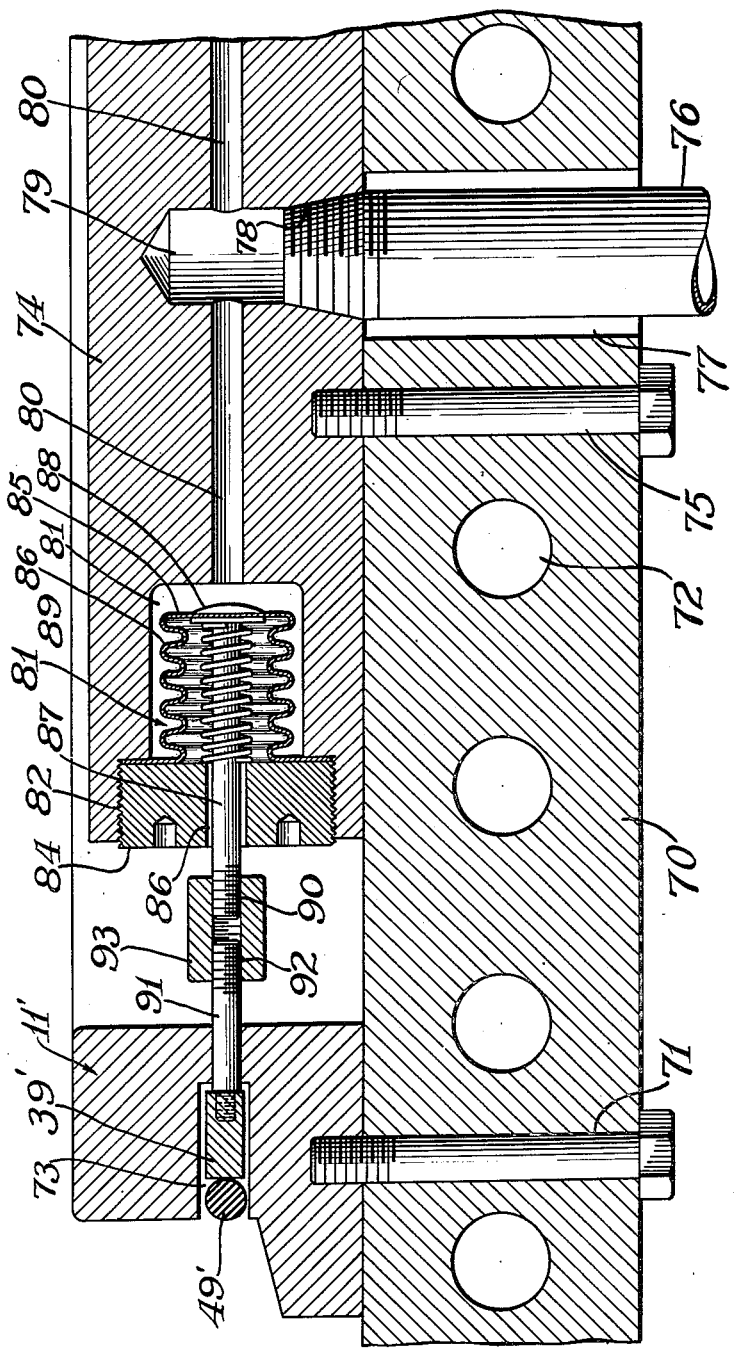
Fig. 14 is a fragmentary enlarged sectional view of another modification of my invention.

Referring particularly to Fig. 14, another modification of my invention is illustrated. In this form of my invention a platen 70 may comprise the lower platen of a machine similar in construction to the machine illustrated in Fig. 1 with the exception that a different means is employed for establishing radially outward pressure upon the segments. A lower mould 11' similar to mould 11, is positioned upon the upper surface of the platen 70 and is secured thereto by means of bolts 71, only one of which is shown. The platen 70 is provided with intercommunicating openings 72, through which a heated fluid is adapted to be passed to heat said platen and also heat the lower mould 11'.

The mould 11', similar to the mould 11, is of annular shape and is provided with an annular notch or open recess 73, in which a plurality of segments 39' are positioned in similar fashion to the positioning of segments 39 in the lower mould section 11. A band 49' similar to band 49, may be positioned in the annular recess 73 in circumscribing relationship with respect to the segments 39'.

A distributing member 74, which may be circular in shape, is secured to the upper face of platen 70 by means of bolts 75, only one of which is shown, said member being disposed within the lower mould section 11'. A pipe 76 projects through opening 77 provided in the platen 70 and is threadedly positioned as at 78 in the member 74. The pipe 76 opens into a cavity 79 in the central portion of the member 74, and from said cavity a plurality of circumferentially spaced bores 80 extend radially, said bores being in communication with the cavity 79.

Each of the bores 80 opens at its opposite end into a recess 81. The recess 81 opens outwardly to the outer peripheral surface of the member 74 and is provided with an enlarged portion 82 adjacent said outer surface, the inner defining wall of the enlarged portion being threaded.

A piston assembly 83 is adapted to be positioned in each recess 81. Each assembly 81 comprises a plug member 84 which carries external threads adapted for engagement with the threads upon the inner periphery of the enlarged recess 82. A piston 85 is carried by the plug 84 and is of the type comprising an accordion wall 86 constructed of relatively resilient metal. This type of piston is well known and is usually referred to as a "sylphon" piston.

The center of the plug 84 is provided with an aperture 86 in which a piston rod 87 is slidably positioned. The rod 87 terminates in a head portion 88, which is secured in fluid type relationship to the end wall of the piston 85. A coil spring 89 embraces rod 87 within the piston 85 and abuts at one end against the plug 84, and at the opposite end against the head 88 of the piston rod, whereby a force is exerted upon the piston 85 tending to expand the same in its normal state.

The opposite end of each piston rod 87 projects radially outwardly from each plug 84 and is provided with screw threads 90. Rods 91 are mounted upon the segments 39' and project inwardly from the mould section 11' in alignment with each of the piston rods 87. The outer ends of rods 91 are also provided with screw threads 92. A sleeve or turnbuckle 93 engages the ends of the rods 87 and 91, and in view of the fact that the threads 90 and 92 are pitched in opposite directions, rotation of the sleeve 93 tends to bring the ends of said rods closer together or remove them further apart, thus constituting an adjustment between the piston rods 87 and the segments 39'. It is to be understood, of course, that although only one piston assembly is illustrated, the member 74 is provided with a plurality of such assemblies which are circumferentially spaced from each other, there being one piston assembly for each of the segments 39', carried by the mould section 11'.

In operation, the mould section 11' is employed in conjunction with an upper or outer mould section similar to the section 15, and said outer section is carried upon a piston actuated platen similar to the platen 9. It can readily be seen that when the upper or outer mould section 15 is positioned over the lower or inner mould section 11', a mould cavity is provided similar to the cavity 19. Consequently, if a belt carcass is disposed in said mould cavity, it is positioned to receive pressure which may be exerted upon the band 49' by the outward movement of the various segments 39'.

In operation the pipe 76 is connected at its opposite end to a source of fluid under pressure (not shown). The pressure fluid may comprise compressed air, steam or a liquid under hydraulic pressure. When fluid under pressure is introduced into the pipe 76, said fluid is transferred to the recess 81, thereby establishing a differential pressure upon the inner and outer surfaces of the piston 85. The piston is accordingly compressed which causes an outward movement of the rods 87 which in turn, is transmitted to the segments 39'. In this manner pressure is established upon the band 49' which in turn bears upon the inner surface of the carcass positioned within the mould cavity. After the carcass carried in the mould cavity is subjected to predetermined pressure and heat, the fluid pressure in pipe 76 is released and each of the piston rods 87 is retracted radially inwardly under the influence of springs 89. This action retracts the segments 39' and hence, pressure of the band 49' upon the carcass is relieved and the carcass may be readily removed from the mould cavity after the upper mould section has been raised.

Referring particularly to Fig. 9, another modification of my invention is shown. In this form of my invention 94 indicates the lower or inner mould section and 95 indicates the outer or upper mould section. When said sections are in operative position with respect to each other, a mould cavity 96 is provided. The inner mould section 94 is provided with an annular recess 97 which opens outwardly into the mould cavity 96.

A flexible annular tubular member 98 is positioned within the recess 97, said flexible tubular member being constructed of a material such as flexible rubber or the like. A tube 99 is positioned through a wall of the inner mould section 94 and opens into the interior of the tubular member 98 as shown best at 100 in Fig. 9.

In operation the two mould sections 94 and 95 are respectively carried by lower and upper heated platens of a press, and consequently, said mould sections are heated. The belt carcass is inserted in the mould cavity 96 and the upper or outer mould section 95 is brought into operative moulding position with respect to the lower or inner mould section. Fluid under pressure is then introduced into the annular tubular member 98 through the tube 99, thereby expanding the flexible walls of the tubular member 98. The expansion of the tubular member 98 establishes radial pressure upon the inner surface of the carcass carried in the cavity 96 and thus subjects said carcass, during the curing thereof, to a substantially uniformly distributed outward radial pressure. The fluid introduced into the tubular member 98 may comprise air under pressure or may be a hydraulic fluid.

It will be seen that herein is provided a method for moulding and curing transmission belts especially of the V-type. My invention is particularly characterized in that the belts are uniformly densified during moulding and curing which results in a well balanced belt which runs true and will not tend to twist during use. My invention is further characterized in that no trimming of the belt is necessary after moulding and curing and the cover thereof remains intact. Another advantage residing in my invention comprises the making of a belt which is substantially uniformly incrementally weighted throughout its length which results in a smoothly running belt devoid of uneven inertia effects which are particularly noticeable and troublesome in fast moving belts.

I am aware that many modifications of my invention may be made without departing from the spirit of the invention and, hence, I do not wish to be limited except as necessitated by the prior art.

I claim as my invention:

1. In a method of making substantially trapezoidal cross-sectioned transmission belts of the type comprising curable plastic material which comprises positioning an uncured belt carcass of solid substantially trapezoidal cross-section having strength members embedded therein substantially parallel to and adjacent the larger of one of the two substantially parallel surfaces thereof in a confined zone to substantially completely fill said zone, applying radially outwardly resilient pressure upon the opposite substantially parallel surface of said belt remote from said strength members after said carcass has been positioned in said confined zone and while it is in said zone uniformly to densify said carcass, and curing said uniformly densified carcass by heat while it is subjected to said resilient pressure.

2. In a method of making endless substantially trapezoidal cross-sectioned transmission belts of the type comprising curable plastic material which comprises confining under pressure an endless uncured belt carcass of solid substantially trapezoidal cross-section having strength members embedded therein substantially parallel to and adjacent the larger of one of the two substantially parallel outer surfaces thereof in a zone to substantially completely fill said zone, applying outwardly radially directed resilient densifying pressure upon the opposite substantially parallel face of said belt remote from said strength members while said carcass is confined in said zone uniformly to densify said carcass in said zone, and curing said uniformly densified carcass by heat while it is subjected to said resilient densifying pressure.

3. In a method of making endless substantially trapezoidal cross-sectioned transmission belts of the type comprising curable plastic material which comprises confining under pressure an endless uncured belt carcass of solid substantially trapezoidal cross-section having strength members embedded therein substantially parallel to and adjacent the larger of one of the two substantially parallel outer surfaces thereof in a zone to substantially completely fill said zone, applying outwardly radially directed resilient densifying pressure upon the opposite substantially parallel face of said belt remote from said strength members while said larger surface is maintained in substantially immovable contact with a defining surface of said zone and while said carcass is confined in said zone uniformly to densify said carcass in said zone, and curing said uniformly densified carcass by heat while it is subjected to said resilient densifying pressure.

4. In a method of making transmission belts of the type comprising curable plastic material which comprises confining an uncured endless belt carcass of solid cross-section having strength members embedded therein substantially parallel to and adjacent an outer surface thereof in a zone to subject said carcass to initial lateral pressure while said carcass can move within said zone a limited degree at right angles to said laterally applied pressure, thereafter applying resilient densifying pressure upon the opposite outer face of the inner surface of said belt remote from said strength members while maintaining the face of the carcass adjacent the strength members substantially stationary and after said carcass has been initially pressed in said zone and while it is maintained under lateral pressure in said zone to densify said carcass, and curing said carcass by heat while it is subjected to said resilient densifying pressure.

ROBERT J. GORECKI.

REFERENCES CITED

The following references are of record in the file of this patent:

UNITED STATES PATENTS

| Number | Name | Date |
|---|---|---|
| 890,409 | Cox | June 9, 1908 |
| 1,649,843 | Mommy | Nov. 22, 1927 |
| 1,756,266 | Voth | Apr. 29, 1930 |
| 1,998,817 | Meyer | Apr. 23, 1935 |
| 2,253,792 | Leavenworth | Aug. 26, 1941 |